Nov. 28, 1944. C. E. SMITH ET AL 2,363,753
WELDING APPARATUS
Filed April 10, 1943  3 Sheets-Sheet 1

Inventors
M.M.A. SEELOFF
C.E. SMITH
By Francis J. Klempay
Attorney

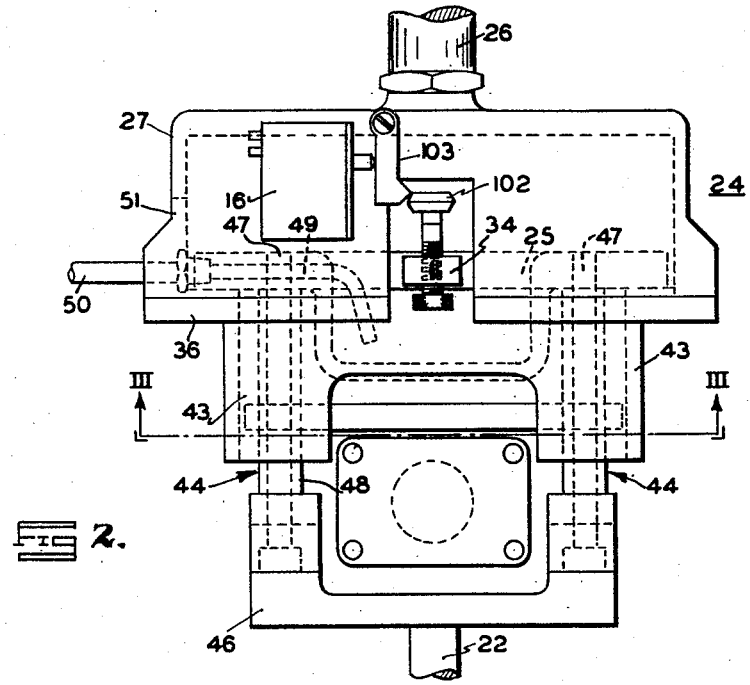
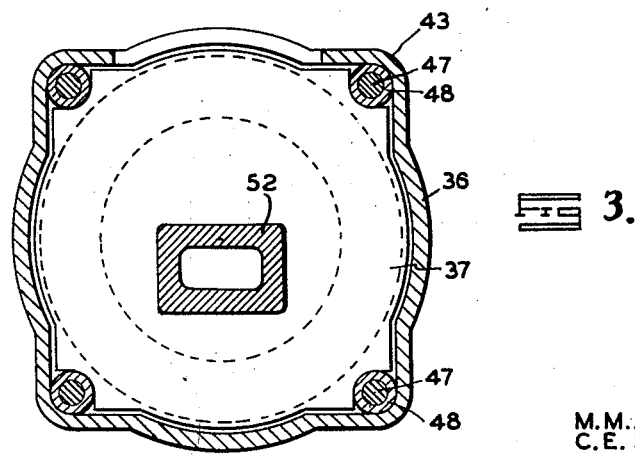

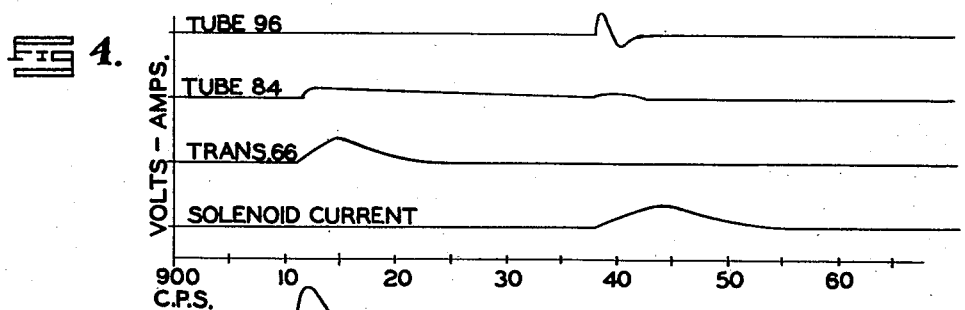
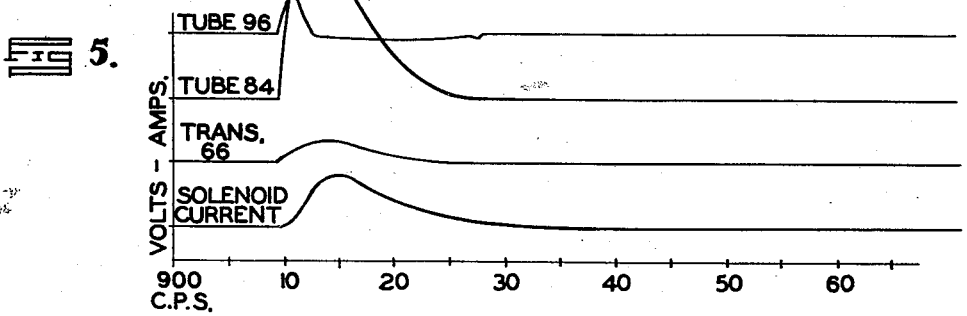
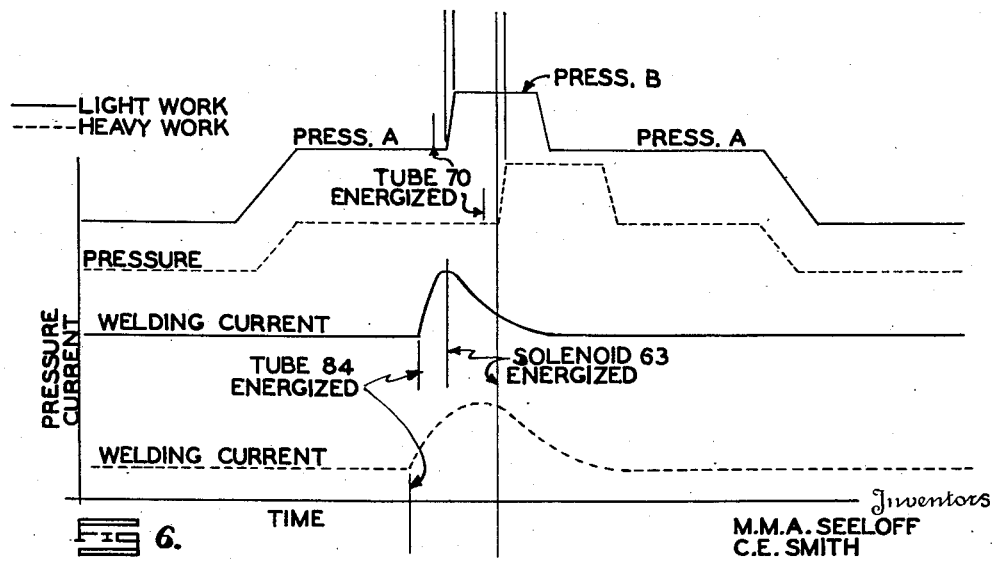

Patented Nov. 28, 1944

2,363,753

UNITED STATES PATENT OFFICE 2,363,753

WELDING APPARATUS

Clyde E. Smith, Port Homer, and Melvin M. Seeloff, Warren, Ohio, assignors to The Taylor-Winfield Corporation, Warren, Ohio, a corporation of Ohio Application April 10, 1943, Serial No. 482,630

18 Claims. (Cl. 219—4)

This invention relates to electric welding apparatus and to timed circuits for energizing electromagnetic devices in connection with such apparatus.

In the art of electric resistance spot welding a common practice has been to employ electrode operating mechanisms which are capable of exerting predetermined pressures between the electrodes and the work during portions of the welding cycles and higher pressures during other portions of the welding cycles. This mode of operation, particularly if the higher pressure is applied suddenly at a predetermined time during or following the flow of welding current, is known to improve the density or quality of the weld, to effect a reduction in the electrical energy consumed, and in the case of heavy work to eliminate the fissures which would otherwise normally appear in the weld upon its cooling. Heretofore, the inability of the known arrangements to apply the increased pressure with the speed required and with the proper accuracy of time in respect to the initiation of the flow of welding current has, in many applications, nullified the efficacy of the fundamental method. The problem is particularly acute in spot welding thin sections where the nature of the work as well as commercial necessity dictates a rapid completion of each welding cycle. One object of the invention therefore is the provision of an improved welding system of the dual pressure kind wherein a high degree of precision in control of the pressure cycle in relation to the flow of welding current may be effected.

It should be obvious that the attaining of the desired degree of precision in the timed control of the application of the different pressure to the work requires precision in the operation of the mechanical elements of the complete system as well as precision in the operation of the electrical control circuits utilized in the actuation of the mechanical elements. Further, in order that variation in final result be kept to the lowest possible minimum, it is essential that the design and operation of the electrical parts be correlated with the design and operation of the mechanical elements. With respect to the mechanism for applying the differential pressure, it has been heretofore proposed to employ a cylinder and piston and to either increase the pressure above the piston through a suitable valving arrangement or to employ a counter-pressure below the piston and employ a time controlled valve to exhaust the counter-pressure at the proper time in the welding cycle. The uniformity of operation of both these methods requires that the piston be in the same position in each succeeding welding operation and this is impractical to attain due to the wearing down of the electrode tips and variations in the thickness of the stock being welded. Secondly, once the piston has moved down and stopped the subsequent application of the different pressure thereto does not necessarily result in the instantaneous corresponding variation in pressure between the electrodes and work because of the erratic nature of the friction existent between the piston and the cylinder wall and possibly between the piston rod and the piston rod packing. The present invention seeks to obviate these described uncontrollable factors in the operation of dual pressure welding systems and it is accordingly another object of the invention to provide, in a welding system, an arrangement for changing quickly from one welding pressure to another during the welding cycle wherein the interval between the actuation of the mechanical control device and the final effect of such actuation at the point of weld is a constant which may be taken as such in setting the timing of the actuation of said device. These objects are accomplished, in accordance with the preferred embodiment of the invention, by employing a pair of flexible bellows having a common wall mechanically connected to the movable electrode and their outer walls fixed with respect to each other and arranged to be moved toward and away from the normally fixed electrode of the assembly by a suitable primary moving means. Different pressures are maintained in the respective bellows and the flow of welding current is initiated while the primary moving means is in motion, while the common wall is moving with respect to the spaced end walls, and when the common wall reaches a predetermined position with respect to said end walls. The pressure in one bellows is suddenly exhausted a predetermined interval after the initiation of the flow of welding current and it should be at once apparent that the volume to be exhausted is always constant and that the proximate pressure transmitting member possesses no starting friction so that the time interval between the opening of the exhaust port and the final application of the different pressure to the work is always constant.

Another object of the invention is the provision, in a welding system, of a unitary welding pressure exerting and pressure changing mechanism comprising a combined pressure applying device and electromagnetically actuated valve assembly, said valve being operative to vary the pressure exerted by said mechanism.

With respect to the circuits heretofore employed to time the energization of pressure changing devices during the welding operations, a common practice has been to initiate the flow of alternating current to a solenoid, for example, a predetermined interval after the initiation of the flow of welding current. The inability of this form of energy to normally complete the required travel of the solenoid armature in a half cycle of current renders impossible any precision of control and, moreover, since the energizing circuit is established at random on the voltage half cycle a time inconsistency results which is much greater than the normally desired tolerance. It should be appreciated that in many operations the interval desired between the initiation of flow of welding current and the application of the different pressure is as short as 8 milliseconds. While, in the case of A. C. machines, an accurate timing might conceivably be effected by synchronizing the solenoid operating voltage with the welding current the delay period would not be adjustable except in steps of one half cycle which again would not approach the required precision. These methods, moreover, are dependent on critical tube characteristics which is objectionable and the latter method cannot, for obvious reasons, be employed in welding systems having non-periodic welding current as stored energy equipment, for example. The present invention has, as a further object, the provision of an improved timing and energizing circuit for actuating the pressure changing mechanism of a spot welding apparatus at a precision timed but finally adjustable interval after the initiation of the flow of welding current regardless of the nature of the source of such current.

The above objects relative to the electrical timing and energizing features are accomplished, in accordance with the invention, primarily by employing the discharge of a capacitor to effect the full stroke of an electromagnetically actuated device during the initial portion of a unidirectional surge of energy from the capacitor. With the armature in retracted position the parameters of the capacitor-solenoid circuit are such that said initial portion falls within the first quarter cycle of a free oscillatory discharge whereby the travel of the solenoid armature is rapidly effected in a predetermined interval of time. However, when the armature is in outer or actuated position the increase in inductance of the electromagnetic device is sufficient to drive the circuit parameters far beyond critical damping whereby the balance of energy in the circuit decays exponentially to hold the armature in its outer position a length of time sufficient to enable it to accomplish its intended function. Preferably a thyratron is employed to valve the flow of current into the coil and the present invention also presents an improved arrangement for initiating conduction in the valve upon the expiration of a precision timed interval following the appearance of a reference condition.

The above and other objects and advantages of the invention will become apparent to those skilled in the art upon consideration of the following detailed specification and the accompanying drawings wherein there is illustrated a practical application and a preferred embodiment of the various principles of the invention.

In the drawings:

Figure 2 is a side elevation of a portion of the mechanical apparatus of Figure 1;

Figure 3 is a horizontal section of the apparatus of Figure 2, the view being taken along the line III—III of Figure 2;

Figures 4 and 5 depict characteristic curves taken from oscillographs during operation of the system of Figure 1 with the controls set for medium timing and short timing, respectively; and Figure 6 is a graph showing various pressure-current relationships effected by the operation of a system constructed in accordance with the invention.

Figure 1:
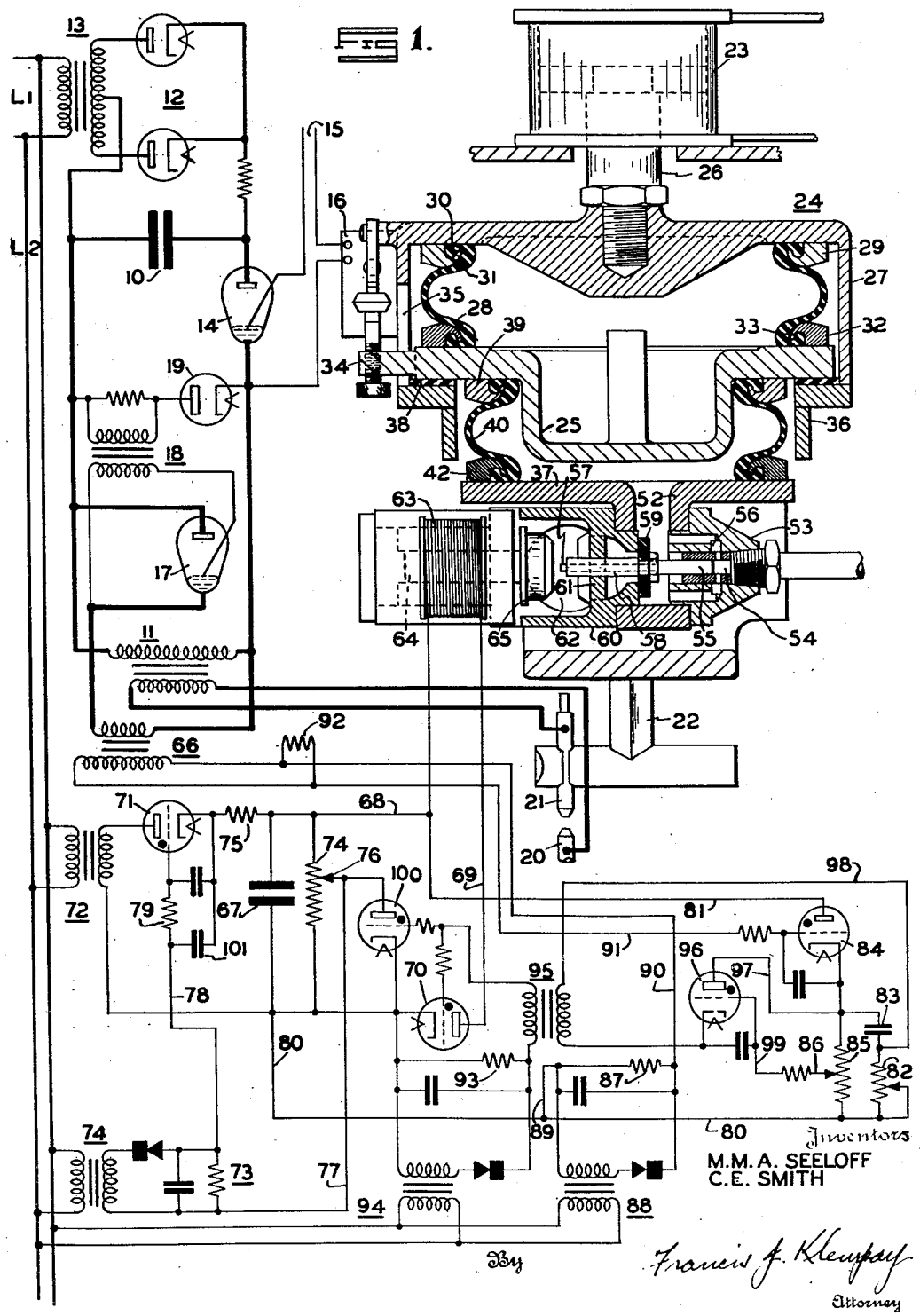
Figure 1 is a schematic diagram of a welding system constructed in accordance with the principles of the invention, the mechanical dual pressure exerting apparatus being shown in section.

In Figure 1, which illustrates the application of the principles of the invention to a resistance welding system of the capacitor discharge type employing a welding transformer and a heavy duty rectifier connected in parallel with the primary winding of the transformer to prevent oscillation in the capacitor discharge circuit, reference numeral 10 indicates the principal or power capacitor which is arranged to be discharged through the primary winding of a welding transformer 11. Capacitor 10 may conveniently be charged by a rectifier 12 deriving energy from an alternating current line L1 through the transformer 13. A suitable circuit controlling device, as the ignitron 14 for example, is employed to connect the previously charged capacitor 10 to the primary of the transformer 11 at the proper time in the welding cycle. For this purpose, a suitable ignition current source 15 is connected across the cathode and ignition element of the ignitron 14 through a normally open switch 16 the construction and operation of which will be explained in detail below. In parallel with the primary of the transformer 11 is the heavy duty rectifier 17 which may take the form of an ignitron identical with the tube 14. Ignitron 17 is provided with a suitable ignition circuit which may include the secondary of an impulsing transformer 18 the primary of which is in series with a rectifier 19 across the primary of the transformer 11. The connections of rectifying tubes 17 and 19 are of such polarity with respect to the normal charge on the capacitor 10 that they are conductive only upon the appearance of inverse voltage in the capacitor discharge circuit as is well understood in the art.

The secondary winding of transformer 11 is permanently connected to the welding electrodes 20 and 21 the former of which is normally fixed in the welding machine while the latter is carried by a slide 22 which is preferably anti-frictionally mounted in the welding machine as described and claimed in the co-pending application of S. M. Humphrey and M. M. A. Seeloff, Serial No. 387,878, now U. S. Patent No. 2,313,941. An air cylinder 23 which may have either a normally fixed or a readily variable length of stroke is employed to reciprocate the slide 22 and to impart welding pressure therethrough. Intermediate the operating rod of the cylinder 23 and the slide 22 is the double pressure air lock unit of the present invention, said unit being designated generally by the reference numeral 24. The construction and operation of the unit 24 will now be described.

In its illustrated and preferred embodiment, the unit 24 consists essentially of a pair of opposed bellows having a common wall 25 rigidly connected to the slide 22, the outer two walls of the bellows being fixed with respect to each other and carried by the rod 26 of the cylinder 23. Thus, to the lower end of the rod 26 is rigidly secured a bell-shaped member 27 having an impervious upper wall against which is clamped one end of a flexible bellows 28 by means of the clamping ring 29. As shown, ring 28 has an outwardly directed lipped flange 30 which is engaged by the flange 31 of the ring 29 to effect an airtight connection between the end wall of the bell 27 and the end wall of the ring 28. Ring 28 is free to expand and contract in an axial direction and is of rubber impregnated fabric construction or other suitable construction having the required flexibility and capable of withholding the air pressures employed. The opposite ends of ring 28 are identical and a clamping ring 32 having an inwardly directed flange 33 is employed to clamp the lower end of ring 28 to the floating or moving wall 25 which likewise is impervious to the passage of air. As shown in Figure 1, the member 25 is provided with an integral extension 34 which projects through a slot 35 formed in the side wall of the bell 27.

To the lower end of bell 27 is bolted a cup-shaped housing 36 having a bottom wall 37 and an inwardly directed shoulder 38 against which the outer peripheral portion of the wall 25 is adapted to rest when the bellows 28 is in expanded condition. Clamped to the under surface of wall 25 inwardly of the shoulder 38 and by means of the ring 39 is a second flexible ring 40 similar in all respects to the ring 28 except that it is of smaller diameter as shown. To avoid leakage between the surfaces bounded by the respective bellows 28 and 40 gaskets are placed under the head of the screws which hold ring 39. The lower end of bellows 40 is clamped to the end wall 37 of the housing 36 by means of the ring 42. Integral with the housing 36 are the four circumferentially spaced lugs or bosses 43 each provided with a vertically extending bore adapted to slideably receive connecting rods 44. As indicated, the bores aforesaid extend entirely through the housing 36. Rigidly connected to the slide 22 by bolts for example is a saddle 46 and the rods 44 are utilized to rigidly connect the saddle 46 to the floating wall member 25. Thus the rods each comprise a bolt 47 which extends up through an ear on the saddle 46 and a sleeve 48 encircles the bolt intermediate wall 25 and the ear to maintain the proper spacing of the parts. It should now be apparent that the slide 22 moves in unison with the wall 25.

Fluid under pressure, preferably air, is conveyed into the upper bellows by a bore 49 extending through the wall 25, a conduit 50 being connected with the bore and extending out of the bell 27 through a slot 51. Means now to be described is provided to furnish fluid pressure, preferably air, to the lower bellows and to rapidly exhaust this pressure when desired in a uniform and rapid manner. For this purpose the member 37 constituting the bottom wall of the lower bellows is formed with a downwardly turned hollow projection 52. Inserted in an aperture in one wall of projection 52 is a fitting 53 having a bore 54 arranged to be connected to a suitable source of fluid under pressure.

Slidably mounted in the bore 54 is a valve 55 which is arranged to control the flow of air between the outer portion of a bore 54 and the radial port 56 which communicates with the space in projection 52 as shown. Valve 55 is of the plunger type and is rigidly connected to an elongated pin 57 which is slideably received in a bore extending through a valve stem 58. The pin 57 is provided to insure the closing of valve 55 before valve 59 is opened but, if desired, these valves may be coupled together to move simultaneously. Stem 58 carries the valve 59 the seat of which is located on the inner surface of a member 60 inserted in an aperture in the opposite side wall of the projection 52. Stem 58 is slideably mounted in a spider 61 spanning the hollow space in member 60 and this space is open to a large exhaust port 62. Connected to the member 60 is a solenoid 63 having an operating plunger 64. Plunger 64 is provided with a head 65 and since the pin 57 projects outwardly of the stem 58 the energization of solenoid 63 first moves valve 55 to cut off port 56 and thereafter opens the large valve 59 to rapidly exhaust the air in the lower bellows. This action involving the shutting off of the air supply before actuating the exhaust valve is advantageous from a timing standpoint since it eliminates the possibility of the inrushing air from interfering with the predetermined timed operation of the main valve and the rate of exhaustion of the lower bellows. Thus accurately timed and abrupt operating characteristics can be achieved. Upon de-energization of solenoid 63 plunger 64 and head 65 are retracted by a spring, not shown, and another spring, not shown, moves valve 55 inwardly to uncover port 56 and to close valve 59.

While various control circuits may be employed to energize the solenoid 63 in proper timed sequence, the circuit illustrated in Figure 1, which will now be described in detail, possesses many advantages which will be hereinafter pointed out and which will become apparent from the detailed description thereof. The function of such circuit whatever its arrangement is to energize the solenoid 63 so as to effect completion of the operating movement of its armature at an accurately timed interval as measured from the start of the flow of welding current and to maintain each energization for a predetermined length of time in order that the higher selected welding pressure may be exerted for the desired length of time and in proper phase relation in the welding cycle. This may necessitate some means to effect a condition upon the start of the flow of welding current and in the case of capacitor discharge welding systems involving a rectifier in shunt with the principal inductance of the load circuit the means may take the form of an impulsing transformer 66 having its primary in series with said rectifier. It should be understood however that the primary of such transformer may be placed anywhere in the discharge circuit and, further, that the principles are equally applicable in systems utilizing alternating and other types of welding current.

In accordance with the principles of the present invention, the solenoid 63 may be arranged to be energized by the discharge of a capacitor 67, this capacitor being shown as being connected to the solenoid through the conductors 68 and 69 in the latter of which is positioned a circuit controlling device preferably a thyratron 70. The value of capacitor 67 is chosen with regard to the total amount of energy required to effect the initial actuation of the solenoid and valves and to maintain the plunger and valves in their actuated positions for a predetermined length of time. Having determined the value of capacitor 67 solenoid 63 is so designed that its operating circuit will have the following characteristics. First, the inductance of the coil when the plunger is in retracted position is so chosen with respect to the value of capacitor 67 that an oscillatory circuit is effected in which the frequency is such that the current passes almost through the first one half cycle thereof during the time that the plunger moves to outer position. Thus positive and high speed operation is attained and the interval between the start of conduction in the device 70 and the full opening of the exhaust valve 69 is definitely predetermined. Secondly, solenoid 63 is so constructed that its inductance at the time the plunger is in outer position is sufficiently increased to shift the circuit constants beyond critical damping so that upon the plunger reaching its outer position and the valve 59 being fully opened the current in the coil is unidirectional with a rate of decay low enough to hold the plunger in outer position for the required or desired period of time. Upon the current decaying below a predetermined value air pressure on valve 55 and the action of the plunger returning spring return the parts to their initial starting positions. Another important advantage of the presently described operating system is that the plunger of the solenoid is first allowed to pick up speed before engaging the valve operating elements. Moreover, this desirable mode of operation is accomplished without variation in the time interval between the start of the flow of energizing current and the full opening of the valve.

Capacitor 67 is arranged to be charged by a grid-controlled rectifier 71 deriving energy through a transformer 72 from an alternating current source—conveniently a line L2 leading from the line L1. Rectifier 71 is normally positively biased by a fixed source 73 deriving energy from the line L2 through transformer 74. This biasing circuit includes the positive end portion of a resistance 74 connected across the capacitor 67 and the biasing circuit may be traced from a cathode of rectifier 71 through the current limiting resistance 75, the positive end portion of resistance 74, adjustable tap 76 on resistance 74, conductor 77, resistance 73, conductor 78, and grid resistor 79 to the grid of the rectifier. As the charge on capacitor 67 approaches the value for which the tap 76 is adjusted the potential on tap 76 and conductor 77 will have become negative with respect to the cathode thus driving the grid negative in opposition to the potential of the source 73. The rectifier 71 will be extinguished but upon a drop of voltage across the capacitor 67 the rectifier will again conduct to maintain the selected charge on the capacitor. Connected in series across the capacitor 67 through the conductors 80, 81 and 68 is a variable resistance 82, a timing capacitor 83, and a thyratron 84. A resistance 85 having an adjustable tap 86 is in parallel with the series connected resistance 82 and capacitor 83 between the cathode of the thyratron 84 and the negative terminal of capacitor 67 through the conductor 80. Thyratron 84 is normally biased to cut-off by the potential developed across resistance 87 by a rectifier drawing energy from the line L2 through transformer 88. This biasing circuit may be traced from the cathode of thyratron 84 through resistance 85, a portion of conductor 80, conductor 89, resistance 87, conductor 90, the secondary of transformer 66, and conductor 91 to the grid of thyratron 84. As stated above, transformer 66 is preferably of the current type and connected across the secondary thereof is a resistor 92 across which a voltage is developed upon the flow of current in the transformer. This transformer is so phased that the polarity of its output as developed across the resistor 92 is in opposition to the voltage developed across the resistance 87. Since the voltage across the resistor 92 is considerably greater than that of the fixed bias 87 the thyratron 84 will be rendered conductive immediately upon initiation of the flow of welding current. Conduction in thyratron 84 places a major portion of the voltage across capacitor 67 across the resistance 85 and across the series connected timing capacitor 83 and potentiometer 82. Consequently capacitor 83 begins to charge at a rate determined by the setting of potentiometer 82.

Thyratron 70 which controls the discharge of capacitor 67 through the solenoid 63 is normally biased to cut-off by rectified potential developed across resistance 93 and derived from line L2 through transformer 94. In series with the grid biasing circuit of the tube 70 is the secondary winding of an impulse transformer 95 which has the characteristic of inducing the voltage of steep wave front in its secondary winding as will be well understood. Transformer 95 is arranged to be energized under the control of the electronic valve 96 by the flow of current through tube 84 and potentiometer 82 aided by the discharge of capacitor 83 whereby an impulse of steep wave front is impressed on the primary of the transformer. It will be observed that the anode of valve 96 is connected to the cathode of thyratron 84 as well as to the positive terminal of the capacitor 83 by means of the conductor 97 while the cathode thereof is connected through the primary and conductor 98 to the negative terminal of capacitor 83 and also to the negative terminal of capacitor 67 through potentiometer 82 and conductor 80. Grid potential for valve 96 is derived from tap 86 of resistance 85 through conductor 99. Before conduction in thyratron 84 capacitor 83 has no voltage appearing across it and therefore at the start of conduction the potential on conductor 98 and consequently on the cathode of valve 96 is more positive than the potential at the tap 86. Consequently the valve 96 will be held non-conducting until capacitor 83 is charged to a predetermined voltage at a rate determined by the setting of the potentiometer 82. Upon the capacitor 83 attaining a predetermined charge the potential on its cathode as derived through conductor 98 will become sufficiently negative with respect to the grid to start conduction in the valve 96. Current will then flow through conductors 68 and 81, thyratron 84, conductor 97, valve 96, primary of transformer 95, conductor 98, resistance 82, and through conductor 80 to the opposite side of capacitor 67. More important, however, is the discharge of capacitor 83 through conductor 97, valve 96, primary of transformer 95, and through conductor 98 to the negative terminal of capacitor 83. While the timing of the initiation of conduction in valve 96 is of critical importance for the proper and accurate functioning of the system, the relatively small total energy handled by this valve allows the use of a small tube having negligible temperature characteristics and a low impedance timing capacitor discharge circuit whereby any timing error resulting from the tube characteristics is kept within immeasurable limits.

Transformer 95 is so phased that the steep wave front impulse furnished by its secondary has a polarity opposite to the voltage developed across resistance 93 and the appearance of this impulse consequently results in instantaneous conduction in thyratron 70 to discharge capacitor 67 through the solenoid 63. Having its anode connected to the slide 76 of resistance 74 and its cathode connected to the negative terminal of capacitor 67 is a gas-filled discharge device 100, the grid of which is connected into the grid biasing circuit of the thyratron 70. Consequently tube 100 conducts when tube 70 conducts and causes the potential of slide 76 and of conductor 77 to drop down substantially to the potential of the negative terminal of capacitor 67. This action drives the control grid of rectifier 71 highly negative and the rectifier remains blocked until conduction ceases in tube 70 and 100. At a later time, depending on the time constant of the capacitor 101 which is connected across conductor 78 and the cathode of rectifier 71, rectifier 71 resumes conduction to charge capacitor 67 in preparation for the next succeeding welding operation. Since rectifier 71 is held non-conductive for a short interval even after the decrease of voltage across capacitor 67 to a value insufficient to sustain conduction in thyratron 70 the thyratron 84 and valve 96 are extinguished. It should be observed that the dead short characteristic of the discharge circuit for the capacitor 83 involving the valve 96 insures the complete discharge of the capacitor during each welding operation making it ready to accurately time the application of the higher welding pressure in the next succeeding operation. The above described energizing and timing circuit per se is described and claimed in the co-pending application of C. E. Smith, Serial No. 540,651, a division of the present application.

It will be observed that the lug 34 on the wall member 25 carries an adjustable switch operator 102 which is arranged to engage a lever 103 for closing the switch 16 which is anchored on the bell 27. In operation, therefore, the ignitron 14 cannot be fired until downward movement of the rod 26 is being effected by the cylinder 23 and the electrode 21 has engaged the work whereby the collapsing of the upper bellows is taking place. Assuming there is pressure in the upper bellows and pressure in the lower bellows the resultant welding pressure exerted by the electrodes 20 and 21 will be determined by the difference between these pressures and by the ratio of the effective areas on which these pressures are exerted. A predetermined interval after the initiation of the flow of welding current by closure of the switch 16 and as determined by the setting of the timing circuit above described solenoid 63 is energized and the pressure in the lower bellows is quickly relieved through the large open valve 59. At this time the detracting effect of the pressure in the lower bellows is removed and the welding pressure instantaneously increases the corresponding amount. The increase in pressure is attained while the wall member 25 is in floating position and while the main body of the unit 24 is moving downwardly. Thus all variations in result which may normally be due to inertia and starting friction in the parts are obviated. Moreover, the volume of air to be exhausted from the lower bellows is identical in each succeeding welding operation enabling the delaying or the time required to effect exhaustion of the bellows to be considered as a constant in determining the setting of the timing circuit with regard to the nature of the work at hand. In order that this time constant may be very small so as not to impair the flexibility of the system the space in the lower bellows is reduced to a minimum by dishing the wall member as shown in the drawings.

The operating characteristics of the elements of the timing circuit are represented in Figures 4 and 5, the former dealing with a medium time setting while the latter is concerned with a very short timing period. It will be observed that in either case conduction in tube 84 is initiated within one to two milliseconds from the start of the voltage impulse from transformer 66 and that this delay is substantially constant. Upon the elapse of a predetermined interval as determined by the setting of the potentiometer 82 the tube 96 conducts and within one or two milliseconds the valve 70 begins to conduct to dump the energy stored in capacitor 67 into the coil 63. The sharp wave form of the current passed by tube 96 upon the timing out of the capacitor 83 should be particularly noted. This current passing through the primary of the transformer 95 results in a voltage wave in the secondary thereof of substantially identical form and it will be therefore understood that the time of firing of the tube 70 is substantially independent of the inherent characteristics of the tube. Thus extreme accuracy in timing is possible and the system illustrated has been proven to carry an accuracy of plus or minus 1.5% at normal timing intervals.

Figures 4 and 5 also show the correlation of the discharge of the capacitor 67, the curves being labeled "solenoid current" and Figure 6 shows the correlation of the welding pressures and currents as effected by operation of the solenoid 63. The time lines designated "solenoid 63 energized" represent the instants at which movement of the solenoid armature is completed and it will be observed that the time interval between the energization or start of conduction in tube 70 and the instant when valve 59 reaches its full open position is short and is substantially constant. This follows from the tuned nature of the solenoid energizing circuit as explained above. It should also be noted that upon the full opening of the valve 59 the higher pressure resulting from the opening of the valve is attained very quickly, the delay being substantially constant in each succeeding welding operation. This follows from the small but uniform volume of compressed air contained in the lower bellows 40 at the time the valve is opened and, further, from the fact that the supply of air into this bellows is first cut off by the valve 55 before the valve 59 is opened.

It should now be apparent that we have provided improved resistance welding apparatus which accomplishes the objects initially set out. The invention provides an improved method of changing the welding pressure during the welding cycle and improved arrangements for timing the changing of the pressure with respect to the flow of welding current. Moreover, the synchronizing and timing of the pressure change with respect to the current flow may be accurately effected and controlled regardless of the nature of the welding current employed and of the primary source of energy utilized in the energization of the apparatus employed to effect the change in pressure. As explained above, any suitable device or arrangement operative to effect a condition upon the start of the flow of welding current (or upon the current reaching a predetermined value) may be employed in place of the shunt connected transformer 66. For example, the primary of a transformer may be connected in series with the welding transformer primary and, of course, a system of the invention will be operative whether the current be direct, pulsating or alternating. Also, it is contemplated that if a shunt rectifier is not used to prevent oscillation in a capacitor discharge system, a small high resistance hot cathode shunt tube connection may be used for the purpose of impulsing tube 84.

Instead of providing for the continued actuation of the valve 59 by the current decaying characteristics of the capacitor-solenoid circuit, means may be provided, once the solenoid is actuated, to hold the solenoid closed and valve 59 open until the movable electrode of the machine is retracted.

It will be understood that any suitable means may be employed to charge the solenoid energizing capacitor and that insofar as the tuned nature of the energizing circuit is concerned other tripping means than that specifically disclosed may be employed to initiate discharge of the capacitor in timed relation with respect to the flow of welding current.

Since the features of the invention disclosed herein are susceptible of widely varying embodiments the scope of the invention is not to be limited except as necessitated by the prior state of the art and the scope of the appended claims.

We claim:

1. In welding apparatus having welding electrodes and means to conduct welding current thereto, the combination of means to move one of said electrodes toward the other of said electrodes, a welding pressure controlling device having a member connected to said means, a pair of bellows having spaced outer end walls attached to and carried by said member and interconnected inner end walls connected to the said one of said electrodes, and means to maintain fluid under pressure in the respective bellows.

2. In electric resistance welding apparatus having a pair of work engaging and current conducting electrodes; means to move said electrodes toward each other and to apply welding pressure therethrough comprising a driven member, a second member mounting one of said electrodes, a welding pressure controlling device comprising a pair of bellows having spaced outer end walls attached to and carried by one of said members and interconnected inner end walls connected to the other of said members, and means to conduct fluid under pressure to the respective bellows.

3. Apparatus according to claim 2 further including means to vary the pressure in at least one of said bellows whereby the pressure exerted by said electrodes may be changed during the welding cycle.

4. Apparatus according to claim 2 further including means to initiate the flow of welding current to said electrodes, means to vary the pressure in at least one of said bellows whereby the pressure exerted by said electrodes may be changed during the welding cycle, and means responsive to the flow of welding current to actuate said means to vary.

5. Apparatus according to claim 2 further including means to initiate the flow of welding current to said electrodes, means responsive to the relative positions of said interconnected and said spaced walls to actuate said means to initiate, means to vary the pressure in at least one of said bellows whereby the pressure exerted by said electrodes may be changed during the welding cycle, and means responsive to the flow of welding current to actuate said means to vary.

6. Apparatus according to claim 2 further including means to vary the pressure in at least one of said bellows whereby the pressure exerted by said electrodes may be changed during the welding cycle, said last mentioned means comprising an outlet port in said one of said bellows and a valve in control of said port.

7. In electric resistance welding apparatus having a pair of work engaging and current conducting electrodes; means to move one of said electrodes towards the other of said electrodes and to apply welding pressure therethrough comprising a member having spaced outer walls, a wall member intermediate said outer walls, axially flexible rings interposed between said intermediate wall and each of said outer walls to provide a pair of interconnected pressure exerting and axially aligned collapsible members, means connecting one of said first mentioned members with said one of said electrodes, backing means connected with the other of said first mentioned members, and means to conduct fluid pressure into said collapsible members.

8. Apparatus according to claim 7 further including means to vary the pressure in at least one of said collapsible members whereby the pressure exerted by said electrodes may be changed during the welding cycle, said last mentioned means comprising an outlet port in one of said collapsible members, a solenoid actuated valve in control of said port, and means to energize said solenoid in timed sequence relative to the flow of welding current through said electrodes.

9. Apparatus according to claim 7 further including means to vary the pressure in at least one of said callapsible members whereby the pressure exerted by said electrodes may be changed during the welding cycle, said last mentioned means comprising an outlet port in one of said collapsible members and a solenoid actuated valve for controlling said port, means to control the flow of welding current to said electrodes, means to normally maintain predetermined pressures in said collapsible members, means to move said backing means toward the other of said electrodes and means operative during said movement to initiate the flow of welding current, and means to energize said solenoid in timed sequence relative to the flow of welding current through said electrodes.

10. Apparatus according to claim 7 further including means to vary the pressure in at least one of said collapsible members whereby the pressure exerted by said electrodes may be changed during the welding cycle, said last mentioned means comprising an outlet port in one of said collapsible members and a valve in control of said port, a solenoid for actuating said valve, a capacitor, means to charge said capacitor, and means to discharge said capacitor through said solenoid in timed sequence relative to the flow of welding current through said electrodes.

11. In welding apparatus having a pair of welding electrodes and means to conduct welding current thereto as well as pressure applying means tending to move said electrodes toward each other, the combination of a pressure controlling device interposed in the line of thrust created by said pressure applying means, said device comprising a pair of bellows having spaced outer end walls and interconnected inner end walls connected to one of said electrodes, each of said bellows having an inlet port whereby predetermined pressures may be normally maintained in the respective bellows, the bellows adjacent the said one of said electrodes having an outlet, a valve controlling the inlet port of the last named bellows, a valve controlling said outlet, and means to close said first mentioned valve and open said second mentioned valve in succession.

12. Apparatus according to claim 11 further including a solenoid, an armature therefor, said last mentioned means comprising said armature, and means to effect uniform movement of said armature in uniform time in each succeeding welding cycle.

13. In welding apparatus having a pair of welding electrodes and means to conduct welding current thereto as well as means to move said electrodes toward each other, the combination of a pressure controlling device interposed in the line of thrust created by said moving means whereby the welding pressure may be changed during the welding cycle, means to actuate said device comprising a solenoid, means to energize said solenoid by the discharge of a capacitor, and means to control said energization in timed sequence relative to the flow of welding current through said electrodes.

14. In electric resistance welding apparatus having a device to change the welding pressure during the welding cycle, the combination of means to actuate said device comprising an electromagnetically actuated device, a capacitor, and means to discharge said capacitor through said electromagnetic device in timed sequence relative to the flow of welding current through said electrodes, the parameters of the capacitor-electromagnetic circuit being such that the discharge of said capacitor is unidirectional.

15. In electric resistance welding apparatus having a device to change the welding pressure exerted during the welding cycle, the combination of means to actuate said device comprising a solenoid, a capacitor, means to charge said capacitor, and means to discharge said capacitor through said solenoid in timed sequence relative to the flow of welding current.

16. In electric resistance welding apparatus having electrodes and means to conduct welding current thereto as well as a device to change the welding pressure exerted by said electrodes during the welding cycle, the combination of means to actuate said device comprising a solenoid, a capacitor, means to charge said capacitor, a circuit controlling device operative when conductive to discharge said capacitor through said solenoid, a timing device, means responsive to the flow of welding current through said electrodes to initiate operation of said timing device, and means operative upon said timing device timing out its predetermined period to initiate conduction in said circuit controlling device.

17. Apparatus according to claim 16 further characterized in that said timing device comprises a timing capacitor having an adjustable charging circuit including a gas discharge device arranged to be rendered conductive immediately upon actuation of said welding current responsive means, and further characterized in that said circuit controlling device comprises a grid-controlled gas discharge device, said means operative to initiate conduction comprising means to impulse the grid of said grid-controlled device by the discharge of said timing capacitor upon the timing capacitor attaining a predetermined charge.

18. In welding apparatus having a pair of welding electrodes and means to conduct welding current thereto as well as means to move said electrodes toward each other, the combination of means to change the welding pressure exerted by said electrodes during the welding cycle, means to actuate said pressure changing means comprising a solenoid, an energizing circuit for said solenoid comprising a capacitor and a rectifier for charging the capacitor, and means to electrically connect said energizing circuit to said solenoid in timed relation with respect to the flow of welding current.

CLYDE E. SMITH.
MELVIN M. SEELOFF.